United States Patent [19]

Adams et al.

[11] Patent Number: 4,847,964
[45] Date of Patent: Jul. 18, 1989

[54] METHOD OF PRODUCING A CROWN FOR AN ARTICULATED PISTON

[75] Inventors: Marshal Adams, Morton; Jerry M. Lechner, Washington, both of Ill.

[73] Assignee: Caterpillar Inc., Peoria, Ill.

[21] Appl. No.: 261,457

[22] Filed: Oct. 21, 1988

[51] Int. Cl.⁴ .................................. B23P 15/10
[52] U.S. Cl. ........................ 29/156.5 R; 29/527.6; 29/557; 29/558
[58] Field of Search ............... 29/156.5 R, 156.5 A, 29/527.6, 557, 558; 92/30, 31, 32, 208; 123/193 P

[56] References Cited

U.S. PATENT DOCUMENTS

| | | | |
|---|---|---|---|
| 4,161,165 | 7/1979 | Belush et al. | 92/235 X |
| 4,180,027 | 12/1979 | Taylor | 123/41.35 |
| 4,553,472 | 11/1985 | Munro et al. | 29/156.5 R X |
| 4,581,983 | 4/1986 | Moebus | 29/156.5 R X |
| 4,648,308 | 3/1987 | Matsui et al. | 29/156.5 R X |
| 4,662,047 | 5/1987 | Berchem | 29/156.5 |
| 4,739,684 | 4/1988 | Brown et al. | 29/156.5 R X |
| 4,752,995 | 6/1988 | Collyear et al. | 29/156.5 R |

FOREIGN PATENT DOCUMENTS

| | | | |
|---|---|---|---|
| 206326 | 12/1983 | Japan | 29/156.5 R |
| 206327 | 12/1983 | Japan | 29/156.5 R |
| 2122116 | 1/1984 | United Kingdom | 29/156.5 R |

Primary Examiner—Timothy V. Eley
Assistant Examiner—Peter Dungba Vo
Attorney, Agent, or Firm—S. Richard Booth, Jr.

[57] ABSTRACT

A method of producing a steel alloy articulate piston crown from a forging including the steps of rough machining a combustion crater, a top face, a plurality of ring grooves and a bottom face, chucking on a member inserted into a pin receiving bore, drawing the crown's bottom face against a stop and one side of a cooling gallery against a locator, and finish machining the combustion crater, the top face, and the plurality of ring grooves.

9 Claims, 2 Drawing Sheets

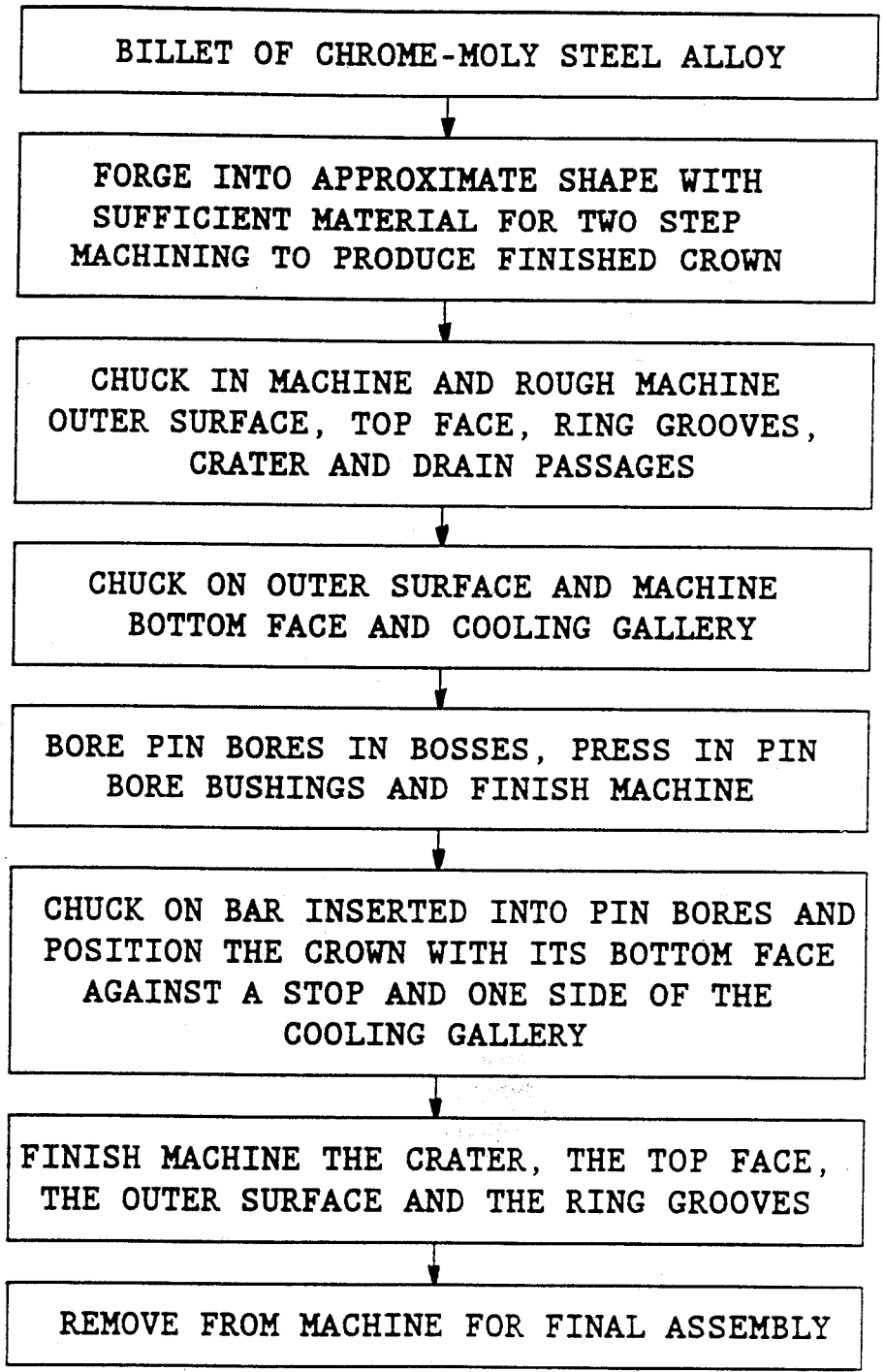

METHOD OF PRODUCING A CROWN FOR AN ARTICULATED PISTON

TECHNICAL FIELD

This invention relates to a method of producing a crown of a two piece piston and more specifically to the method of machining the finished crown.

BACKGROUND

The development of engines over the past few years have included increasing the horsepower without increasing the displacement of the engine. To obtain this increased horsepower, it has been necessary to increase the combustion pressures of the combustion chamber which are transferred through the piston into the connecting rod.

Such increase in pressures have required the improvement of the integrity of the piston to withstand the increased stresses therein. In the past and in many cases today, such pistons are made of aluminum or cast iron. The piston described herein meets the requirement to withstand the increased pressures by providing a crown of a two piece articulated piston that is machined from a forging. The material of the forging is SAE4140, which is an alloy steel containing chrome and molybdenum.

During the development of the higher grade steel piston crown, the material was found to be extremely difficult to machine. Since the material is extremely tough, it has the characteristic of causing gumming of the tooling, and it was necessary to develop a unique machining method which is the subject of this invention.

DISCLOSURE OF THE INVENTION

In one aspect of the invention, the method of producing a crown of an articulated piston is provided. The crown has a circular top face, a combustion crater extending from and below the top face, a sidewall depending from the top face which has a cylindrical surface. A plurality of ring grooves on the sidewall are provided, which are disposed at spaced locations below the top face. The sidewall has an inner surface forming a first side of a cooling gallery that extends adjacent to top face and the combustion crater. A depending center section has a lateral extending pin-receiving bore, therethrough, and a surface adjacent to the crater forming a second wall of the cooling gallery. The sidewall has a bottom face extending between the center of the sidewall and the cooling gallery and is disposed above the pin receiving bore.

The machining steps are as follows: the entire outer surface of the sidewall, the ring grooves, the top face, and the combustion crater are rough machined. The next step is finish machining of the bottom face of the crown. The crown is then removed from the holding device and a chuck member is inserted through the pin receiving bore. The crown is then positioned with the bottom face against a stop and the one side of the cooling gallery against a locator. This positions the crown for the finishing operation which includes finish machining the combustion crater, the top face, the ring grooves, and the cylindrical outer surface of the sidewall while the crown is so positioned.

A second aspect of the invention is a method of the rough machining wherein one portion of the outer surface is grasped in a chuck and the rough machining of that surface proceeds along the outer surface, ending in an area overlying the position of one of the ring grooves. The crown is then removed from the chuck, reinserted on the machined surface, and the remaining material is removed from the outer surface, following which the ring groove is then machined, removing the juncture at the interrupted cut.

The foregoing and other aspects will become apparent from the following description when considered in conjunction with the accompanying drawings. It is especially understood that the drawings are not intended as a definition of the invention, but are for the purpose of illustration only.

BRIEF DESCRIPTION OF THE DRAWINGS

FIG. 2 is a schematic diagram of the method steps producing a crown for a two piece articulated piston.

BEST MODE FOR CARRYING OUT THE INVENTION

Figure 1:
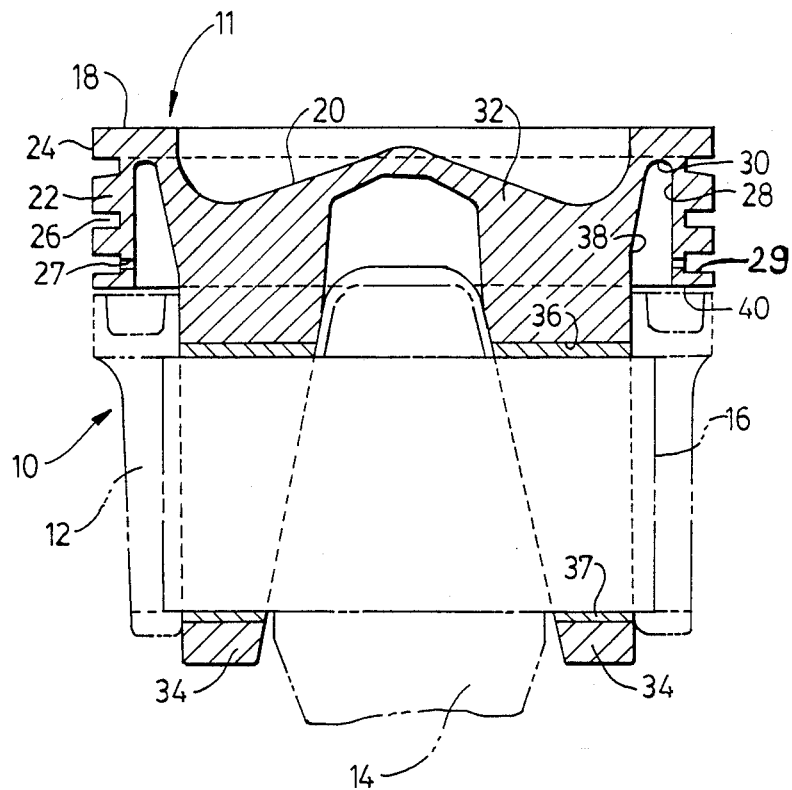
FIG. 1 is a cross sectional view of a two piece articulated piston wherein the crown is shown in section and the skirt, rod and piston pin are shown in broken lines.

In FIG. 1, a two piece articulated piston 10 is illustrated. The two piece piston includes a crown 11 shown in section and an appending skirt 12 shown in broken lines. The crown and skirt are attached to a connecting rod 14 by a piston pin 16. The connecting rod 14 is in turn attached to a crankshaft of an engine not shown.

The crown 11 has a circular top face 18 and a combustion crater 20 extending from and below the top face 18. A circular sidewall 22 depends downwardly from the top face 18 and has a cylindrical outer surface 24. A plurality of ring grooves 26 extend from the cylindrical outer surface 24 into the sidewall 22 and are disposed at spaced locations below the top face 18.

The sidewall 22 has an inner surface 28 forming a first side of an internal cooling gallery 30. Drain passages 27 extend from the bottom of the lower ring groove 29 into the cooling gallery 30. The inner surface 28 extends upwardly to adjacent the top face 18 and the combustion crater 20. A depending center section 32 extends downwardly from below and adjacent to the combustion crater 20 and the top face 18 defining a pair of bosses 34. Each boss has a pin receiving bore 36 therethrough and being in line constitute a continuous pin bore for receiving the piston pin 36. Bushings 37 are pressed into the pin receiving bore. A second side 38 of the cooling gallery 30 is provided by a surface of the center section 32 that begins below the top face 18 and adjacent to the combustion crater 20.

The sidewall 22 has a bottom face 40 extending between the cylindrical surface 24 and the cooling gallery 30. The surface of the bottom face 40 is located above the pin bore 36 or more specifically above a horizontal plane that is tangent to the upper circular surface of the pin bore.

Referring now to FIG. 2, the first step of producing the crown described above is the forging of a billet of an steel alloy material consisting of a chrome molybdenum alloy. This material is the composition set forth in SAE4041 alloy steel. It is composed of carbon, manganese, phosphorus, sulfur, silicon, chromium, molybdenum, and the balance iron and trace elements.

The billet is then placed in a press and is forged by a die into the approximate shape of the piston crown wherein sufficient material is provided to allow for the two step machining process described below.

In one aspect of the invention, the first step includes positioning the crown by chucking it in a lathe or a machining center on its bosses, leaving the outer surface of the sidewall clear for machining. In this step, the crown is then rough machined producing the top face 18, the crater 20, the cylindrical outer surface of the side wall and the ring grooves. The drain passages for an oil ring in the lower ring groove may also be drilled during this step.

An alternate method for the first step is to chuck on the forged outer surface of the sidewall and rough machine one portion thereof, interrupting the cut on the outer cylindrical surface 24 in an area overlying one of the ring grooves. The crown is then removed from the chuck and rechucked on the rough machined surface. The remaining surfaces described above are then rough machined, again interrupting the cut on the cylindrical sidewall in the area overlying the one ring groove, following which a rough cut is made cutting the ring grooves and in this manner removing any juncture of the machine surface caused by the interrupted cut.

During the rough machining operation, approximately 0.030 inch (0.75 mm) of material is left for the finish machining operation.

In the next step, the crown is chucked on the outer cylindrical surface, exposing the lower surface of the piston for machining. In this step, the bottom face 40 and the walls of the cooling gallery 30 are machined as are the pin bores 36 in the bosses 34.

The next step in the bushings 37 are pressed into the pin bores 36 which are then finish machined to the dimension which will be acceptable to the piston pin when installed in the engine.

In the following step, a bar or chuck member is inserted into the pin bores, which is grasped by a drawbar within the machine chuck. The bottom face 40 of the piston crown is drawn against a face plate or locator of the chuck. This locates the crown in a centered position on the chuck for the final machining operation. The crater surface, the top face surface, the cylindrical outer surface, and the ring grooves are then finish machined.

Following the finish machining operation, the crown may be removed from the chuck and prepared for final assembly.

The two step machining of the crater, top face, cylindrical outer surface and the ring grooves produces a finished surface free of tool marks or other infractions that may propagate any cracks that will destroy the integrity of the crown.

The above method does not include the processing steps to produce the finished cooling gallery or the steps for the forging process.

Other aspects, objects, and advantages become apparent from study of the specification, drawings, and appended claims.

We claim:

1. A method of producing a crown of an articulated piston, the crown having a circular top face, a combustion crater extending from and below the top face, a side wall depending from the top face and having a cylindrical outer surface, a plurality of ring grooves in the side wall and disposed at spaced locations below the top face, the side wall having an inner surface forming a first side of a cooling gallery that extends adjacent the top face and the combustion crater, a depending center section having a laterally-extending pin-receiving bore therethrough, said center section having a surface forming a second side of the cooling gallery, the side wall having a bottom face extending between the cylindrical side wall and the cooling gallery and disposed above the pin-receiving bore; the method comprising the steps of:
   a. rough machining the cylindrical outer surface of the side wall, the ring grooves, the top face, and the combustion crater;
   b. finish machining the bottom face of the crown;
   c. inserting a member through the pin-receiving bore and positioning the crown with its bottom face against a stop and one side of the cooling gallery against a locator; and
   d. finish machining the combustion crater, the top face, the ring grooves, and the cylindrical outer surface of the side wall while the crown is so positioned.

2. The method, as set forth in claim 1, including the step of forging the crown from a billet of steel alloy to approximately the shape of the finished crown with sufficient material for the rough machining and finish machining steps.

3. The method, as set forth in claim 2, wherein the steel alloy is comprised of carbon, manganese, phosphorus, sulfur, silicon, chromium, molybdenum and the balance iron and trace elements.

4. The method, as set forth in claim 1, wherein approximately 0.030 inch (0.75 mm) of material remains after the rough machining step to be removed by the finish machining step.

5. The method, as set forth in claim 1, wherein the step of rough machining includes holding the crown by clamping the bosses in a chuck.

6. The method, as set forth in claim 1, wherein the step of rough machining includes:
   a. grasping the side wall adjacent one end thereof and machining a portion of the outer cylindrical surface thereof between another end of the side wall and an area overlying the position of one of the ring grooves.
   b. grasping said rough finished portion of the cylindrical outer surface, and rough machining the remaining portion of the cylindrical outer surface of the side wall between said one end and said overlying area of the one ring groove;
   c. cutting said one ring groove in the side wall and removing any juncture of the rough machining operations of steps a and b; and
   d cutting the remainder of said ring grooves.

7. The method, as set forth in claim 1, including the steps of:
   a. rough machining the pin receiving bore in the bosses;
   b. finish machining the pin receiving bore;
   c. installing bushings in the finished bore; and
   d. machining an inner diameter of the installed bushings to their finished diameter before step c of claim 1.

8. In a method of machining a crown of an articulated piston, the crown having a circular top face, a combustion crater extending from and below the top face, a relatively short side wall depending from the top face and having a cylindrical outer surface, a plurality of ring grooves recessed in the side wall and disposed at spaced locations below the top face, the side wall having an inner surface forming a first side of a cooling gallery that extends adjacent the top face and the combustion crater, a depending center section having a laterally-extending pin-receiving bore therethrough, the side wall having a bottom face extending between the cylindrical side wall and the cooling gallery and disposed above the pin-receiving bore, the method of machining comprising:

a. grasping the side wall adjacent one end thereof and rough finishing a portion of the cylindrical outer surface thereof between another end of the side wall and an area overlying the position of one of the ring grooves;

b. grasping said rough finished portion of the outer surface, and rough finishing another portion of the cylindrical outer surface of the side wall between said one end and said overlying area of the one ring groove;

c. cutting said one ring groove in the side wall and removing any juncture of the rough finishing operations of steps a and b; and d. cutting the remainder of said ring grooves.

9. In a method of machining a crown of an articulated piston, as set forth in claim 8, further comprising the steps of:

a. rough machining the top face, the combustion crater and the bottom face;

b. finish machining the bottom face of the crown;

c. machining the laterally-extending pin-receiving bore through the depending center section;

d. inserting a member through the pin receiving bore and positioning the crown with the bottom face against a stop and one side of the cooling gallery against a locator; and e. finish machining the combustion crater, the top face, the cylindrical outer surface and the ring grooves while the crown is so positioned.

* * * * *

REEXAMINATION CERTIFICATE (4080th)

United States Patent [19]
Adams et al.

[11] B1 4,847,964
[45] Certificate Issued May 9, 2000

[54] METHOD OF PRODUCING A CROWN FOR AN ARTICULATED PISTON

[75] Inventors: Marshal Adams, Morton; Jerry M. Lechner, Washington, both of Ill.

[73] Assignee: Caterpillar Inc., Peoria, Ill.

Reexamination Request:
No. 90/005,234, Jan. 26, 1999

Reexamination Certificate for:
Patent No.: 4,847,964
Issued: Jul. 18, 1989
Appl. No.: 07/261,457
Filed: Oct. 21, 1988

[51] Int. Cl.[7] .................................................. B23P 15/10
[52] U.S. Cl. .............................. 29/888.042; 29/888.049; 29/888.04; 29/527.6; 29/557; 29/558
[58] Field of Search ..................... 29/888.04, 888.042, 29/888.049, 527.6, 557, 558; 92/208; 123/193.6

[56] References Cited

U.S. PATENT DOCUMENTS 2,576,741   11/1951   Witek ............................................ 279/2

OTHER PUBLICATIONS

"Leichtmetallkolben", Everling et al., VEB Verglag Tecnik, 1953, pp. 92–105.

"Jigs and Fixtures—Non Standard Clamping Devices", Hiram Grant, McGraw Hill, panle 792, (1977).

*Primary Examiner*—Irene Cuda

[57] ABSTRACT

A method of producing a steel alloy articulate piston crown from a forging including the steps of rough machining a combustion crater, a top face, a plurality of ring grooves and a bottom face, chucking on a member inserted into a pin receiving bore, drawing the crown's bottom face against a stop and one side of a cooling gallery against a locator, and finish machining the combustion crater, the top face, and the plurality of ring grooves.

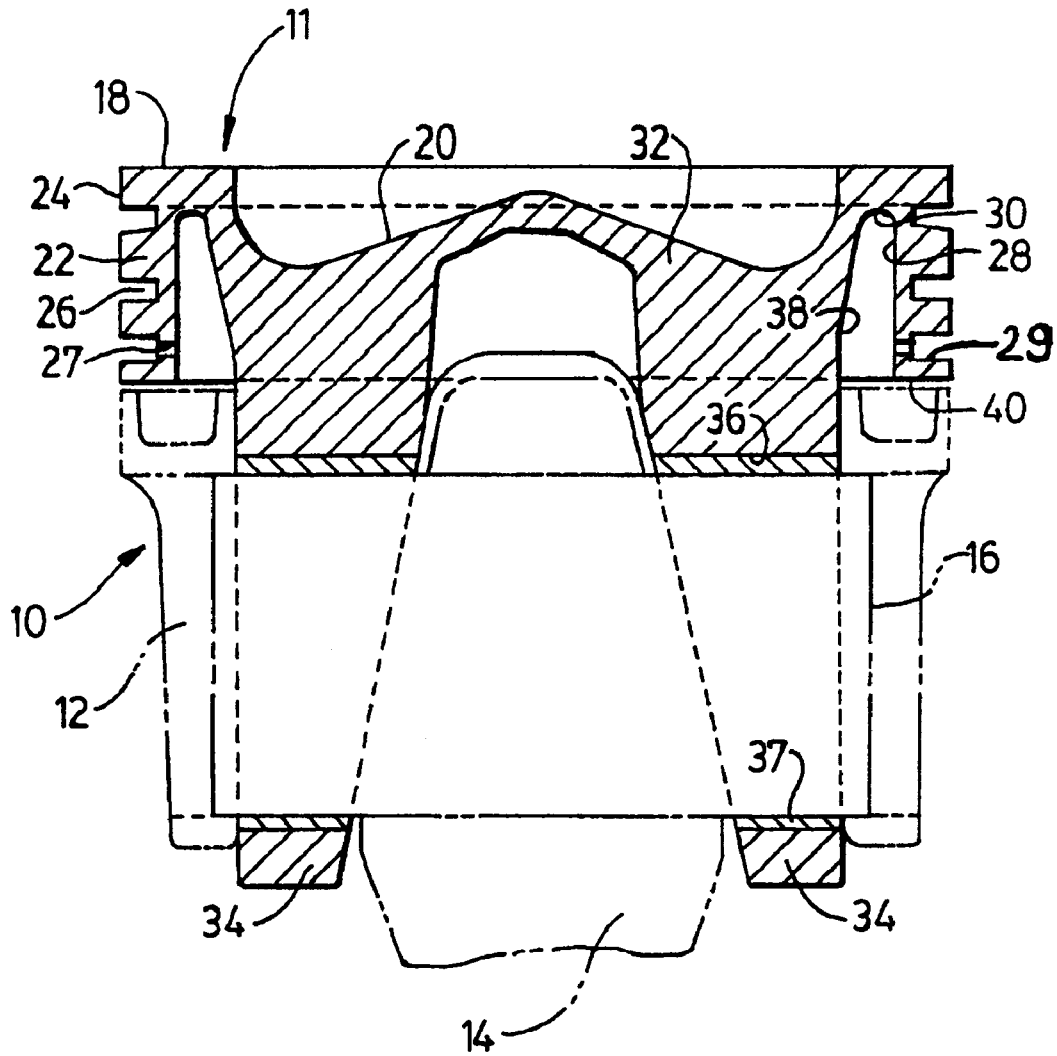

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

* * * * *